June 13, 1961 R. L. CULP 2,988,221
HOME WATER PURIFIER
Filed June 24, 1957 6 Sheets-Sheet 1

RUSSELL L. CULP
*INVENTOR.*

BY *Thos. E. Scofield*

RUSSELL L. CULP
*INVENTOR.*

June 13, 1961   R. L. CULP   2,988,221
HOME WATER PURIFIER
Filed June 24, 1957   6 Sheets-Sheet 4

RUSSELL L. CULP INVENTOR.

BY

June 13, 1961 R. L. CULP 2,988,221
HOME WATER PURIFIER

Filed June 24, 1957 6 Sheets-Sheet 5

RUSSELL L. CULP
INVENTOR.
BY *Thos. E. Scofield*

RUSSELL L. CULP
INVENTOR.

United States Patent Office 2,988,221
Patented June 13, 1961

2,988,221
HOME WATER PURIFIER
Russell L. Culp, Lawrence, Kans.
(1965 Garryanna Way, Corvallis, Oreg.)
Filed June 24, 1957, Ser. No. 667,645
11 Claims. (Cl. 210—104)

This invention relates to water purification units and refers more particularly to a water purification unit adapted to produce pure water in such quantities as may be required by individual households, farms, dairies, resort cottages, motels or other like small individual users of water.

In some areas not served by public water supplies, water is available from wells or springs which is often suitable and sufficiently pure for domestic use without any further purifying treatment. There are commercially available methods and equipment to the individual for improving the quality of these relatively pure waters by the use of home water softeners, chlorinators, or other like devices.

On the other hand, in many other locations the only available source of water supply is from surface water sources or from contaminated ground water sources. These classes of waters require more extensive and complete treatment to make them suitable and safe for domestic use. Few methods and/or little equipment are presently available commercially to individual users for the treatment of these contaminated water supplies. Existing purification systems are generally too expensive, too difficult to construct and install or too complex to operate, or any combination of or all of these. Because of these problems and difficulties, few persons have attempted to purify water from ponds, or lakes for their own use and, thus, many potentially useful sources of private water supply have remained undeveloped. Additionally, as a result, individuals have often resorted to hauling water for long distances at great expense for their personal use. This problem has existed in the art for many years and no satisfactory solution to date has been achieved.

Therefore, an object of the invention is to provide to the average individual water user not served by a public water supply a simple, practical and economical purification unit for the removal of turbidity, bacteria, algae, iron, manganese or other common impurities from water obtained from pounds, lakes, springs, wells or other sources of private water supply.

Another object of the invention is to provide a water purification unit within which the treatment tanks and associated operating apparatus have been combined and arranged into a single small, compact purification unit which can be factory assembled, shipped as a unit, easily installed, and which can be accommodated in most domestic dwellings or outbuildings.

Yet another object of the invention is to provide such a water purification unit which is suitable for use in connection with standard, commercially available pressure tank systems and/or pumps of various sizes and capacities normally used for domestic water supplies, such equipment generally (conventionally) already installed and in use in most households, and the like.

Another object of the invention is to provide such a water purification unit which is inexpensive both in the tanks employed and the controls combined therewith whereby to bring the unit into the price range available to the ordinary farmer, householder, etc.

Yet another object is to provide such a water purification unit which is simple to install and maintain in operation, wherein no construction is required by the user to put it into operation and the ordinary layman can comprehend its operation without special instruction.

Another object of the invention is to provide such a water purification unit which is simple to clean, repair and maintain in operation and wherein all of the parts are readily accessible for such purposes.

Another object of the invention is to provide a water purification unit and system which, although the capacity through the system in operation may be only one gallon per minute, enough water may be stored at the input and output sides of the unit to handle the ordinary pressure tank system output of (typically) from three to seven gallons per minute during the average 12-hour use period.

Another object of the invention is to provide such a water purification unit of such construction and efficiency of operation as to be able to meet the rising health standards for dairies.

Yet another object of the invention is to provide such a water purification system wherein portions of the system used in the purification process are also useable in the backwashing process of the filter to clean it, whereby the number of parts in the system is greatly reduced.

Another object of the invention is to provide such a water purification unit wherein the house pressure system can be employed to flush the filter by virtue of the relatively small size of the latter and due to the relatively small running capacity of the system, as well.

Yet another object of the invention is to provide a home water purification unit wherein the entire system, after the initial input of water to the system, is run by gravity feed throughout.

Yet another object of the invention is to provide such a home water purification unit wherein the carbon employed for removing taste and odor from the water may be employed as a layer on top of the sand layer in the filter rather than as a continuous feed or separate filter as in other conventional processes, thereby avoiding an extra chemical feeder in the system.

Yet another object of the invention is to provide a water purification unit and system having a uniform rate of flow therethrough in the process of purification, thereby simplifying the chemical feeding problem and reducing the complexity of parts needed therefor.

Another object of the invention is to provide a water purification unit as described having an extremely simple chemical feeding system which is easily maintained and wherein the chemicals used in the system may be supplied in pre-prepared envelopes.

Still another object of the invention is to provide a water purification unit which is semiautomatic and only requires the presence of a person thereat in the operating process to wash the filter, it having been possible to have made the system entirely automatic but it being deemed desirable to have a person present to check the filter in the washing process.

Yet another object of the invention is to provide a water purification unit employing minimum sized treatment tanks and filter for the required total daily output of water by employing a constant rate of flow in the purification process through the purifier and using an equalizing tank at the input end of the purifier plus a treated water storage tank at the effluent end of the purifier.

Other and further objects of the invention will appear in the course of the following description thereof.

In the drawings, which form a part of the instant specification and are to be read in conjunction therewith, an embodiment of the invention is shown and, in the various views, like numerals are employed to indicate like parts.

For illustrative and descriptive purposes, the foregoing described figures and the specification to follow show and set forth a home water purification unit designed to produce one gallon of water per minute or 1,440 gallons per day. This capacity is sufficient for most domestic systems. However, the invention is not limited to this size or capacity, since the principles and apparatus set forth and described will apply equally well to smaller or larger units within the range required for the purposes intended. In some states, counties, or cities, it may be necessary to modify slightly the size or capacity of the various parts of the purifier to meet special requirements of local or state health departments or other regulatory bodies. This can be done without departing from the spirit or scope of the invention.

The invention will be described with relation to FIG. 11, the schematic flow diagram which shows the over-all layout and flow sequence of the system, while the like parts numbered on the flow diagram will be like numbered in the figures showing the unit assembled.

Figure 11:
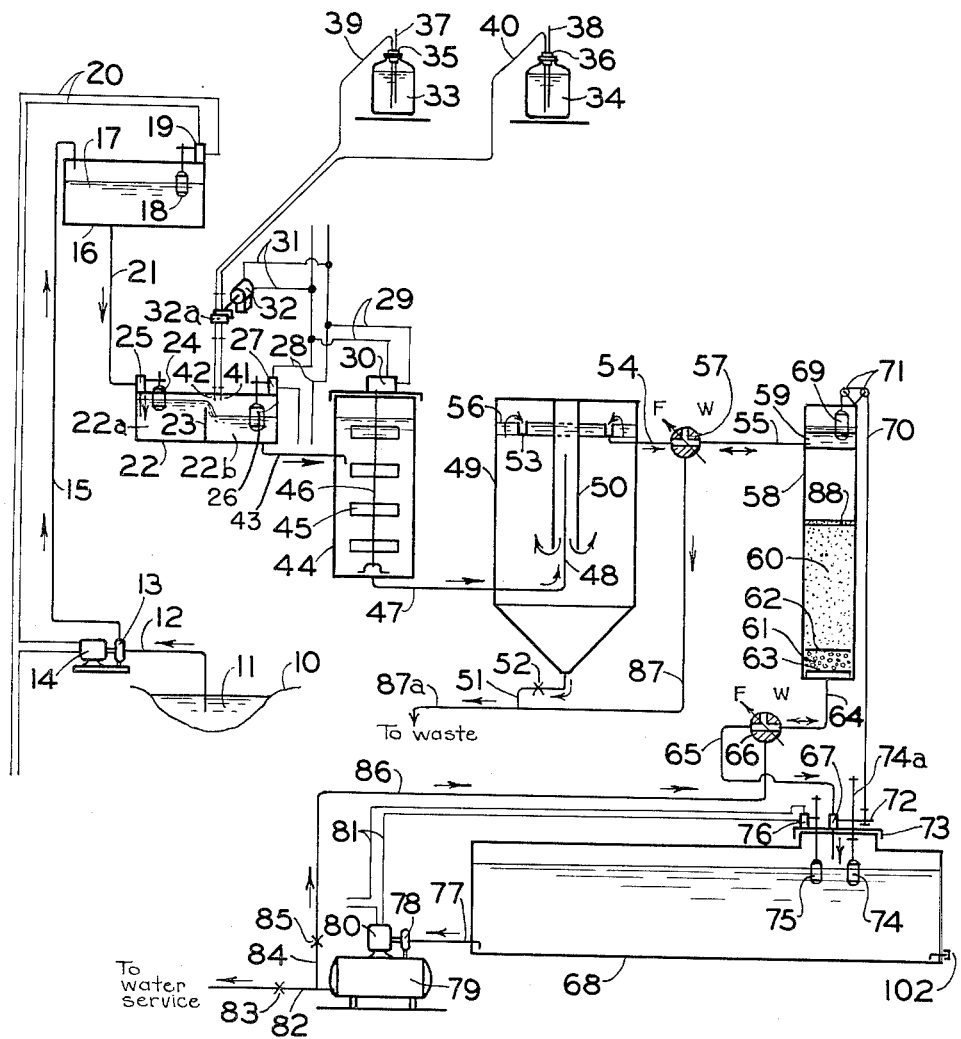
FIG. 11 is a schematic flow diagram of the inventive system and unit.

Referring now to the left side of FIG. 11, at 10 is shown a ground or earth formation having a contaminated water body 11 therein. Withdrawal line 12 passes to the suction side of raw water pump 13, powered by motor 14. Output line 15 passes from the output side of pump 13 to equalizing tank 16. The body of water shown in tank 16 at 17 supports a float 18 used in conjunction with a conventional electric float switch 19, the latter wired into the raw water pump circuit 20. Equalizing tank 16 is sufficiently large (23 gallons) to permit the raw water pump 14 to operate for several minutes at a time even though the raw water pump capacity may exceed that of the plant. The float switch 19 starts the raw water pump when the water level 17 in tank 16 reaches a predetermined low level and stops pump 13 when the water reaches the desired high water level in tank 16. If water from the source of supply will flow to the plant by gravity without pumping, the equalizing tank 16 and its associated apparatus may be omitted.

Withdrawal line 21 from the equalizing tank 16 passes the water to control box 22 which regulates the rate of flow through the purification unit. Box 22 has an upstanding weir plate 23 with a weir notch 23a (FIG. 1) which is calibrated to deliver the desired amount of water (one gallon per minute in the unit illustrated) at the head of water available. The weir plate 23 divides the control box into input section 22a and output section 22b. A direct acting float 24 in the input section of the control box operates an inlet valve 25 to maintain the desired constant level of water in the input section of the control box. The outlet section of the control box contains a float 26 which operates an electric switch 27 which is wired as at 28 into circuit 29 to the flocculator drive motor 30 and circuit 31 to a solenoid control 32 for chemical feeders to be described. The water level in the outlet section of the control box is low when the water is flowing through the purifier and is high when flow through the purifier is stopped. A low water position of the float 26 is employed to actuate the float switch 27 to start the flocculator drive motor 30 and the solenoid control 32 to start the feeding of chemicals to the water, while the high water position reverses these operations.

The treatment chemicals may be added to in the outlet section 22b of the control box 22. Chemicals may be supplied in predetermined and weighed amounts in separate envelopes for each charging of the feeders or they may be measured in special cups supplied for this purpose with the purification unit. The chemical solutions are prepared in glass bottles 33 and 34 by emptying the contents of the envelopes containing the proper amounts of chemical and filling the bottles with water. The bottles are equipped with tight fitting two hole stoppers 35 and 36. Breather tubes 37 and 38 are inserted in one hole with the bottoms thereof set near the bottom of the bottles for admitting air and thus maintaining a consant head on the outside end of siphon tubes 39 and 40, regardless of the solution level in the bottles. The inner ends of the siphon tubes 39 and 40 are inserted through the stoppers 35 and 36 and extend to a level near the bottom of the bottles and slightly below the level of the bottom of the breather tubes. The outer ends of the siphon tubes extend to a point below the bottoms of the bottles. The tips (FIG. 1) 41 and 42 are calibrated orifices. The distance from the bottom of the breather tube to the tip of the siphon tube is the head on the orifice. The head and the size of the orifice are set to produce the desired rate of feed of solution. Any variations required or desired in the amount of chemicals needed to treat different waters may be obtained by varying the length of the outer siphon tubes and, thus, the head on the orifice, or by using more or less than one evelope or measuring cup of chemical in filling the bottles.

The chemicals employed at this point in the treatment process consist of a coagulant, a coagulant aid, and a chlorine compound for disinfection. Suitable coagulants for the purposes of this invention include alum (aluminum sulfate), sodium aluminate, ferrous sulfate, or ferric chloride. Alum is preferred because of its suitability to a wide range of natural waters. Suitable coagulant aids include sodium hydroxide, soda ash and lime. Sodium hypochlorite solution (Clorox, Purex, etc.) will be used for mixture of the coagulant aid and the sodium hypochlorite solution. As previously described, the flow of chemical solutions is stopped or started by means of a solenoid 32 wired to float switch 27 in the control box output section 22b. This is done by movement of the solenoid core which squeezes or releases, between plates 32a, sections of flexible tube in the siphon lines from the chemical feeders 33 and 34.

After the application of the chemicals, the water passes through flow line 43 from the output section 22b of the control box 22 to a flocculation tank 44 of 23 gallons capacity. The water and treatment chemicals are slowly mixed in this basin at a speed of approximately 24 revolutions per minute by a set of paddles 45 mounted on shaft 46 driven by the motor 30. A fractional horsepower electric motor and gear reduction box may be used as the drive. As previously described, the motor 30 is automatically turned off and on by means of the float switch 27 in the output section of the control box.

After coagulation, the water passes through output flow line 47 to a perforated inlet pipe 48 which extends upwardly and centrally of settling tank 49 centrally of receiving cylinder 50 therein. Tank 49 is preferably of 89 gallons capacity. The floc and sediment settle to the bottom of the settling tank and may be drained off periodically by means of line 51 from the bottom of the settling tank having valve 52 therein. The clarified, settled water flows over a circular collection weir 53 and thence through outlet lines 54 and 55 to a rapid sand filter. Supports 56 (FIG. 1) hold the collection and weir and baffle in place in tank 49. Three-way valve 57 is positioned in lines 54 and 55 intermediate the settling tank and the filter tank 58.

Filter tank 58 has filter trough 59 adjacent the top thereof to receive the water from tank 49 and preferably has a cross sectional area of one-half square foot (for the one gallon per minute purifier). The filter is equipped with twenty-four inches of filter sand 60 and four inches of filter gravel 61. Perforated plates 62 and 63 are positioned between the filter sand and filter gravel and beneath the filter gravel, respectively. Filter effluent lines 64 and 65 have three-way valve 66 connecting them. Effluent line 65 passes through control valve 67 to treated water storage tank 68. Float 69 is suspended in the filter input water above sand 60. Float 69 is connected by line 70 over pulley assembly 71 to lever 72 on valve 67. The water level in the filter must be maintained above the top of the sand. A drop in the water level in the filter tank causes float 69 to drop which closes or partly closes (throttles) valve 67 on the filter effluent line 65. Thus a constant water level in the filter is maintained.

The filtered water flows through effluent lines 64 and 65 as well as three-way valve 66 to the treated water storage tank 68. Tank 68 contains sufficient water (212 gallons) in storage to carry through periods of water use in excess of the average output of the purifying unit. It also contains more than enough water in storage for backwashing the filter. A removable cover 73 permits access to the tank 68 for inspection. Float 74 with its attached arm 74a closes the filter effluent valve 67 when the tank 68 is full. In effect, this shuts down the entire purifier since the clsoing of the filter effluent valve causes the water level to rise, backwardly through the system, and eventually in the output section of the control box and input section thereof. Float 26 shuts off the flocculator motor and chemical feeders as already described, and the other float 24 shuts off the flow to the control box. The equalizing tank continues to fill until the raw water pump 13 is shut off by the float 18 and switch 19 in the equalizing tank. When water is again pumped from the treated water storage tank for use, the float control system automatically restores the purifier to service. A second float 75 in the treated water storage tank is used as a low water cutoff for the pressure system pump by means of electric switch 76.

Output flow line 77 from treated water storage tank 68 passes to pressurizing pump 78 on top of pressure tank 79 driven by motor 80 and activated by circuit 81 which connects with the switch 76. Pump 78 is of conventional type for a pressure tank system which includes sufficient air with the water taken in through line 77 to maintain a regulated pressure in tank 79. Output line 82 from pressure tank 79 has control valve 83 therein.

The filter is cleaned of the material filtered from the water by backwashing it at intervals (about twice a week). This can be done either by means of commercially available pressure pumps or by using the conventional pressure tank system schematically shown in FIG. 11 which is ordinarly installed in private water systems. Wash water from tanks 79 and 68 passes into line 84 after valve 83 has been closed, through valve 85 and line 86 to three-way valve 66 which is turned so the wash water passes through line 86 into line 64 and into the output section of the filter. The wash water then passes in reverse flow through line 55 and three-way valve 57 which is again turned to feed into line 87 which joins discharge line 51 from the settling tank to pass through line 87a to waste. The filter wash requires about five to ten minutes at rates of flow of eight to three gallons per minute. The use of the two three-way, three-port valves 66 and 57 greatly simplifies the operation of reversing the flow through the filter for backwashing and restoring the filter to service after cleaning. The two three-way valves are merely changed from "filter" to "wash" position and then returned to their normal operating positions. For taste and odor control of the treated water, activated carbon 88 may be added to the water on top of the filter sand immediately after backwashing. This can be done by batch application in this small purifier, since enough activated carbon can be added at one time to serve until the filter is again washed. Measured amounts of activated carbon will be supplied in envelopes to simplify this procedure.

Although the description of the home water purifier may seem somewhat involved, the actual operation of the plant by the owner is very simple. Once each day, the chemical solution bottles are filled, twice each week, the filter is backwashed. The other operations are carried out automatically by the simple direct-acting controls. The only mechanical moving part is the flocculator motor which will operate for many months without attention.

Figure 1:
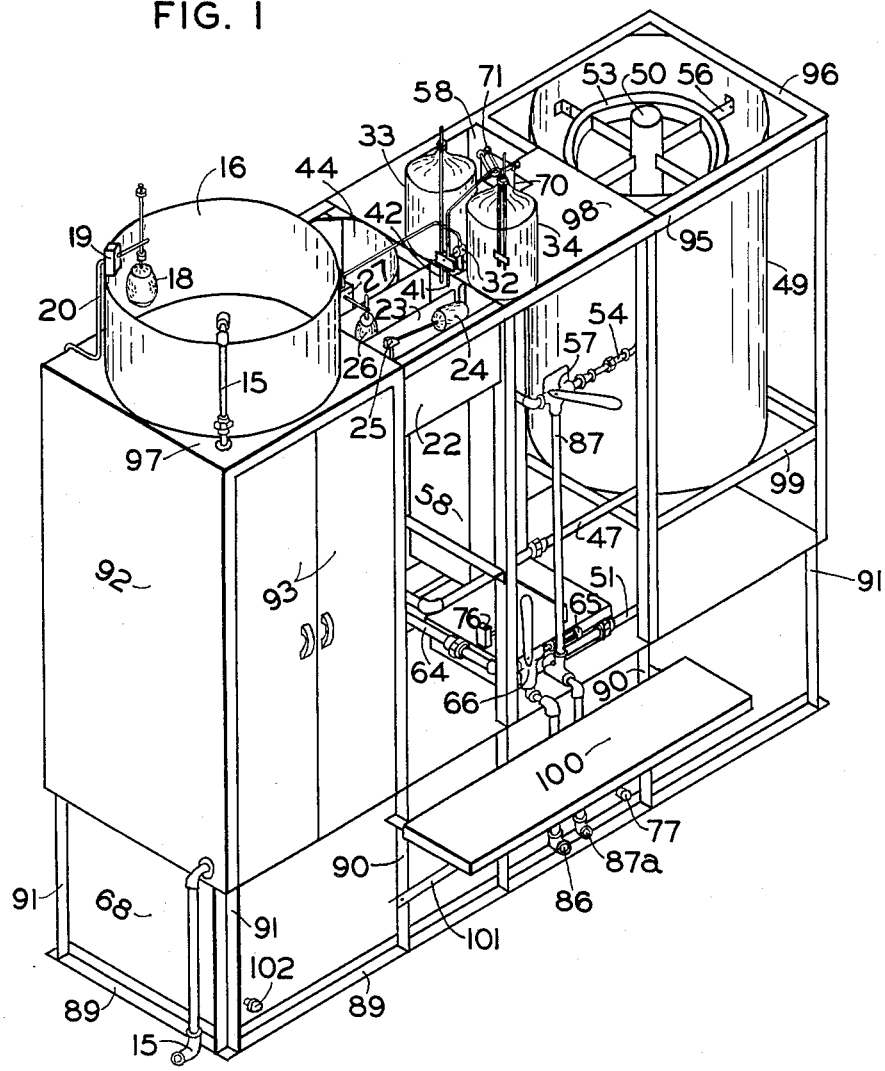
FIG. 1 is a perspective view of the inventive water purification unit.
Figure 2:
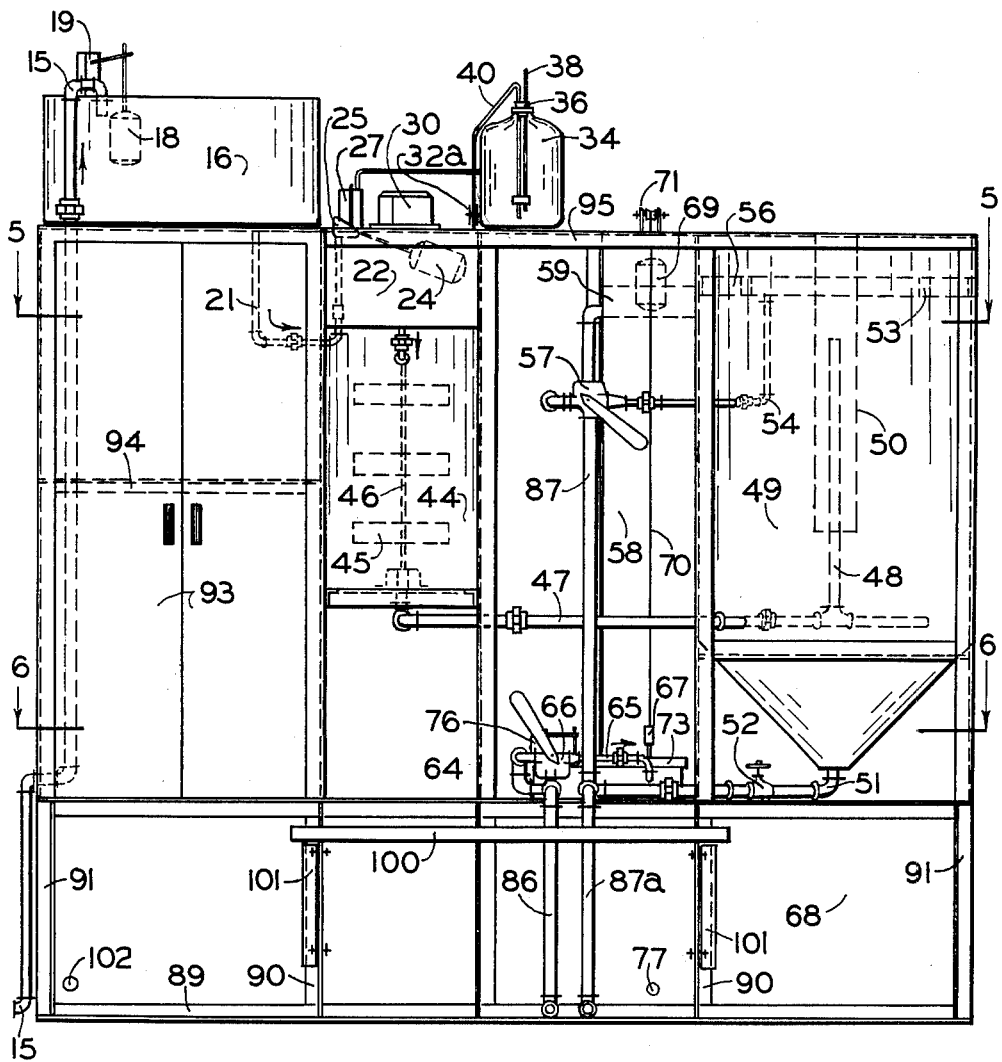
FIG. 2 is a front elevation of the inventive purification unit shown in FIG. 1.
Figure 3:
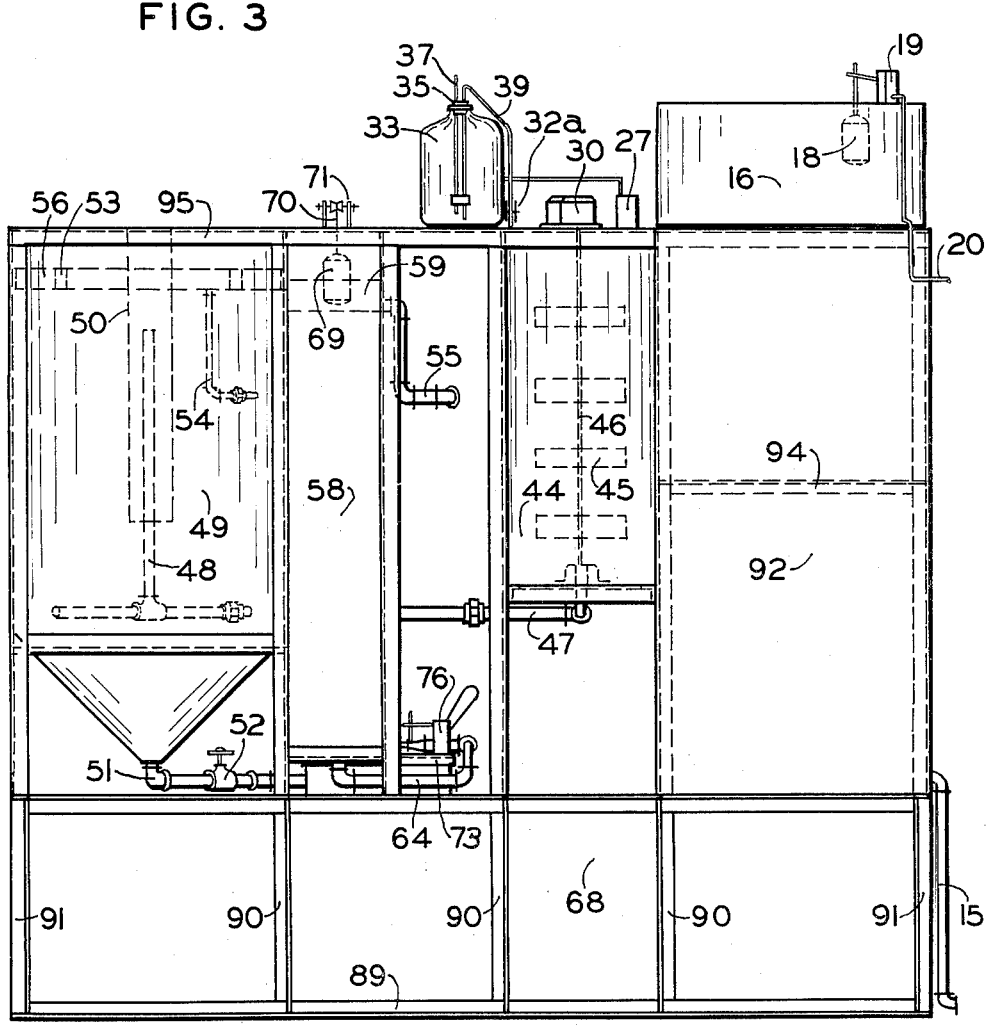
FIG. 3 is a rear view of the inventive water purification unit shown in FIGS. 1 and 2.
Figure 4:
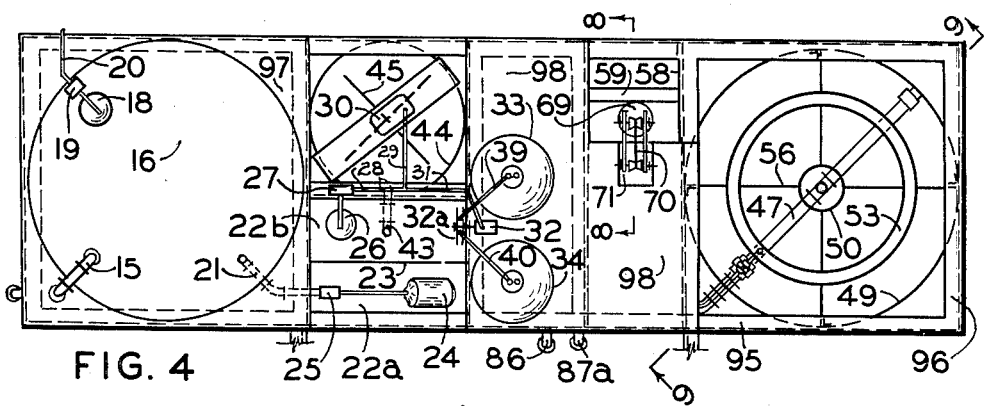
FIG. 4 is a top view of the water purification unit of FIGS. 1–3.
Figure 5:
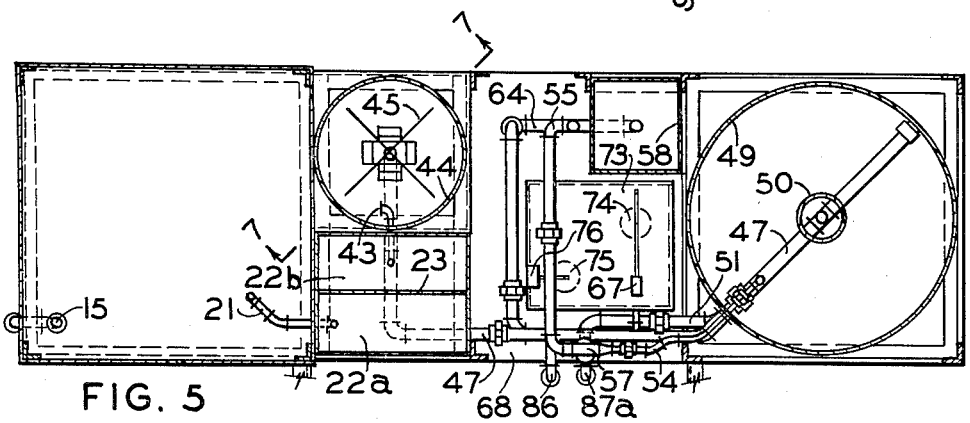
FIG. 5 is a view taken along the lines 5—5 of FIG. 2 in the direction of the arrows.
Figure 6:
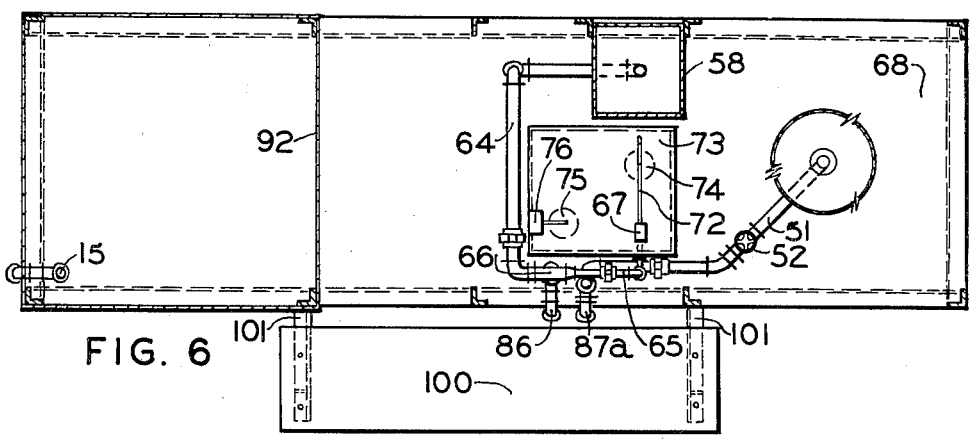
FIG. 6 is a view taken along the lines 6—6 of Fig. 2 in the direction of the arrows.
Figure 7:
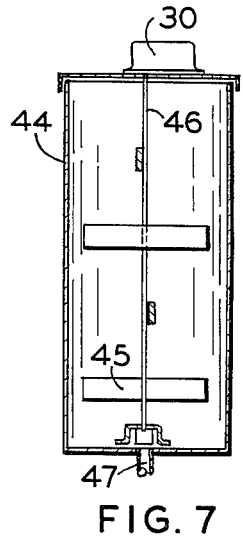
FIG. 7 is a view taken along the lines 7—7 of FIG. 5 in the direction of the arrows.
Figure 8:
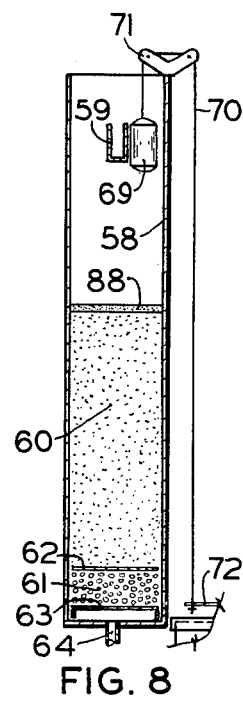
FIG. 8 is a view taken along the lines 8—8 of FIG. 4 in the direction of the arrows.
Figure 10:
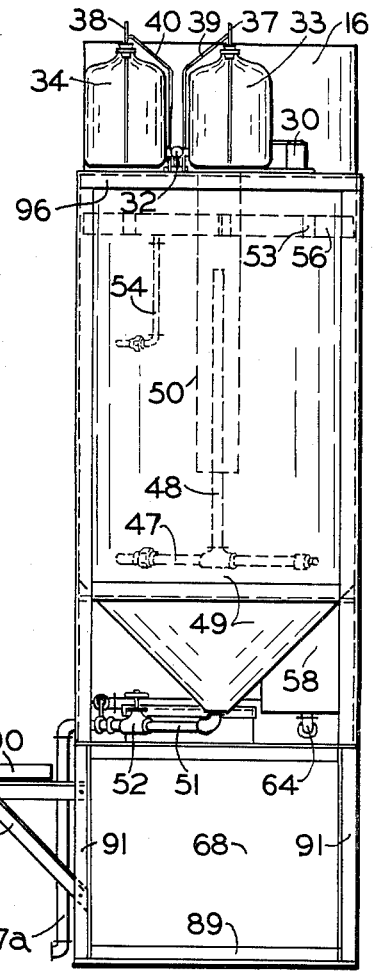
FIG. 10 is a right-hand side view elevation of the purifying unit shown in FIG. 2 in front view.
Figure 9:
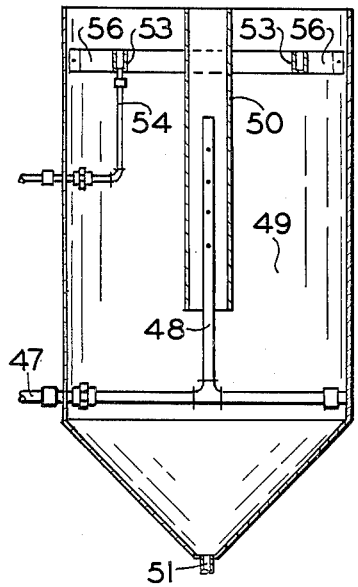
FIG. 9 is a view taken along the lines 9—9 of FIG. 4 in the direction of the arrows.

Turning now to the assembly and mounting of the unit as shown in FIGS. 1–10, and particularly FIGS. 1–3, base members 89 support side members 90 and end members 91. Cabinet 92 with doors 93 and shelves 94 (FIG. 2) is provided in one side of the frame. Top side members 95 and end members 96 join the side and end members in rigid relationship, one with the other. The various tanks and operating parts are positioned relative one another so that gravity feed operation is achieved once the water passes into the equalizing tank. The equalizing tank itself is set on the top 97 of the cabinet 92. The control box is suspended from the cross frame members below the level of the equilizing tank next to the flocculating tank. The chemical bottles are supported on a top shelf 98 opposite the equalizing tank. The settling tank is supported on a member 99 opposite the cabinet 92 on the other side of the frame. The filter tank is suspended within the frame between the settling tank and the flocculating tank. The tops of the control box, the flocculating tank, the settling tank and the filter tank are all on the same level, below the equalizing tank. The treated water storage tank is positioned across the entire bottom of the frame below the outlet from the filter tank. The pressure tank itself and its pump are not shown except in the schematic view of FIG. 11. A removable inspection platform 100 is provided for observation of the parts of the purification unit in operation. Platform 100 is bolted to the main angle iron side frame members 90 by brackets 101.

By packing the equalizing tank within the supply storage cabinet 92, the outside dimensions of the entire purifier unit ready for shipment are two feet three inches wide by six feet six inches high by seven feet six inches long. To install the purifier, the owner has only to place the equalizing tank and inspection platform in position, connect the raw water supply line to pipe line 15, connect the pressure system suction line 77 in the side of the storage tank, connect the discharge line from the pressure system to wash water line 84, connect the control circuit 20 to the raw water pump and connect the control circuit from switch 76 to the pressure tank pump motor 80. An additional pipe nipple 102 (FIG. 11) into the storage tank is provided for the connection of supplemental storage tanks, if desired.

From the foregoing it will be seen that the invention is one well adapted to attain all of the ends and objects hereinbefore set forth, together with other advantages which are inherent to the system and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter hereinabove set forth or shown in the accompanying drawings is to be interpreted as illustrative and not in a limiting sense.

Having thus described my invention, I claim:

1. A home water purification device comprising a control box having an input section and an output section substantially separated from one another, means including a flow line from a source of water for passing water to the input section of the control box, valve control means on said flow line cooperating with sensing means in said input section to so regulate the quantity of water passed into the input section as to provide a relatively constant quantity of water in said input section, means in the control box for regulating the quantity of water passing from the input to the output section, said last two means operative to meter the raw water flow into said output section and limit it to a constant rate, at least one source of purifying chemical positioned above said control box, a gravity flow line from the source of purifying chemical to the output section of the control box, means for controlling the flow of purifying chemical according to the water level in the output section of the control box whereby to flow at a lower level and stop flow at a higher level, a flocculating tank positioned for gravity flow from the output section of the control box, stirring means in the flocculating tank, a control for the stirring means actuated according to the water level in the output section of the control box, whereby to stir at a lower level and stop stirring at a higher level, a gravity flow line for transferring chemically treated water from the output section of the control box to the flocculating tank, a settling tank positioned for gravity flow from the flocculating tank, a gravity flow line for transferring water from the flocculating to the settling tank, a gravity filter tank positioned for gravity flow from the settling tank, filtering means in said filter tank including a layer of sand, a gravity flow line for transferring water from the upper portion of the settling tank to the upper portion of the filter tank, a treated water storage tank positioned for gravity flow from the filter tank, a gravity flow line for transferring water from the lower portion of the filter tank to the treated water storage tank, valve control means in the latter line, means actuated by the water level in the filter tank operative to open said last valve only when the water level in the filter is higher than the top of the sand and means actuated by the water level in the treated water storage tank to open said last valve only at a lower level therein and close it at a higher level therein.

2. A device as in claim 1 including a renewable layer of activated carbon on the top of the layer of sand in the filter tank.

3. A device as in claim 1 including an equalizer tank of markedly greater volume than the input section of the control box, means for passing water from a source thereof into the equalizing tank, means for controlling the flow from the source of water to the equalizing tank by the level in the equalizing tank, said last means including a flow line and pump thereon, the operation of the pump being controlled by the level of the water in the equalizing tank, and the flow line to the input section of the control box being a gravity flow line connected to said equalizer tank.

4. A device as in claim 1 including a pressure tank, a flow line for transferring water from the treated water storage tank to the pressure tank, means for maintaining the pressure in the pressure tank, a protective float switch on the treated water storage tank operative to stop operation of the means for maintaining pressure in the pressure tank at a lower water level in the treated water storage tank and to permit operation of the means for maintaining pressure at a higher level of water in the treated water storage tank, and a discharge line from the pressure tank.

5. A device as in claim 1 including a pressure tank, a flow line for transferring water from the treated water storage tank to the pressure tank, means for maintaining the pressure in the pressure tank, a discharge line from the pressure tank, a valve on the discharge line from the pressure tank to the output lower end of the filter whereby to permit flow of water from the pressure tank in reverse flow to the output lower end of the filter, a valve on said last flow line, and means for removing the water from the upper input end of the filter in reverse flow without passing said water back into the settling tank.

6. A device as in claim 5 wherein the means for removing water from the upper input side of the filter in reverse flow comprise a three-way valve positioned in the flow line from the settling tank to the filter and a discharge flow line from said valve.

7. A device as in claim 5 including a three-way valve in the line from the filter to the treated water storage tank and wherein the line from the pressure tank discharge line is connected to said three-way valve.

8. A device as in claim 1 wherein the means to transfer the purifying chemical from its source to the output section of the control box comprises a constant head gravity solution feeder with a calibrated orifice.

9. A device as in claim 1 wherein the flocculating tank has a tangential flow entrance-way, the means for transferring water from the flocculating tank to the settling tank draws from the bottom of the flocculator tank centrally thereof and wherein the flocculator tank is not aerated.

10. A device as in claim 1 wherein the settling tank feeds the fluid flow from the floculator tank centrally of a vertically positioned cylindrical baffle sealed at the top thereof and at least substantially centrally positioned within the settling tank, said feed passing from a flow line perforated in the portion thereof extending within the cylindrical baffle, said baffle having an open submerged lower end.

11. A unitary portable water purification device comprising a frame, an equalizer tank atop the frame, means including a flow line for flowing water from a source thereof to the equilizing tank, control means on the frame regulating the flow from the source of the equilizer tank according to the level in the latter whereby to maintain a substantially constant level therein, a control box mounted on the frame below the equilizer tank having an input section and an output section substantially separated from one another and disposed in substantially horizontal relationship relative to one another, a gravity flow line for flowing water from the equilizer tank to the input section of the control box, control means including a valve for regulating the quantity of water passed into the input section of the control box according to the level therein whereby to provide a relatively constant quantity therein, means in the control box for regulating the quantity of water passed from the input to the output section, said last two means operative to meter the raw water flow into said output section and limit it to a constant rate, at least one source of purifying chemical mounted on the frame above the output section of the control box, a gravity flow line to transfer the chemical from the source to the output section of the control box, means on the frame for controlling the flow of purifying chemical according to the water level in the output section of the control box, whereby to flow at a lower level and stop flow at a higher level, a flocculating tank mounted on the frame with the body of the flocculating tank extending below the control box top, stirring means in the flocculating tank, a control for the stirring means mounted on the frame and actuated according to the level of water in the output section of the control box, whereby to stir at a lower level therein and stop stirring at a higher level therein, a gravity flow line for transferring the chemically treated water from the output section of the control box to the flocculating tank, a settling tank mounted on the frame, with the body of the settling tank extending below the control box top, a gravity flow line to transfer water from the flocculating tank to the settling tank, a gravity filter tank mounted on the frame with the body of the filter tank extending below the control box top, filtering means in the filter tank including a layer of sand, a gravity flow line for transferring the water from the upper portion of the settling tank to the filter tank, a treated water storage tank mounted on the frame below the outlet from the filter tank, a gravity flow line for transferring water from the filter lower output end to the treated water storage tank, means on the frame including a valve in the latter line actuated by the water level in the filter tank operable to permit flow only when the water level is above the sand in the filter, and means on the frame also controlling said last valve means by the water level in the treated water storage tank whereby to flow only at a lower level therein and stop flow at a higher level therein.

References Cited in the file of this patent

UNITED STATES PATENTS

| | | |
|---|---|---|
| 499,583 | Powers | June 13, 1893 |
| 669,335 | Behrend | Mar. 5, 1901 |
| 989,235 | Day | Apr. 11, 1911 |
| 1,496,678 | Rutter | June 3, 1924 |
| 1,985,435 | Watson | Dec. 25, 1934 |
| 2,269,393 | Crampton | Jan. 6, 1942 |
| 2,452,970 | Vincent | Nov. 2, 1948 |
| 2,502,349 | Sebald | Mar. 28, 1950 |
| 2,640,807 | Rice | June 2, 1953 |